H. L. FERRIS.
STALL AND MANGER.
APPLICATION FILED JULY 28, 1911.
1,034,774.
Patented Aug. 6, 1912.
3 SHEETS—SHEET 3.
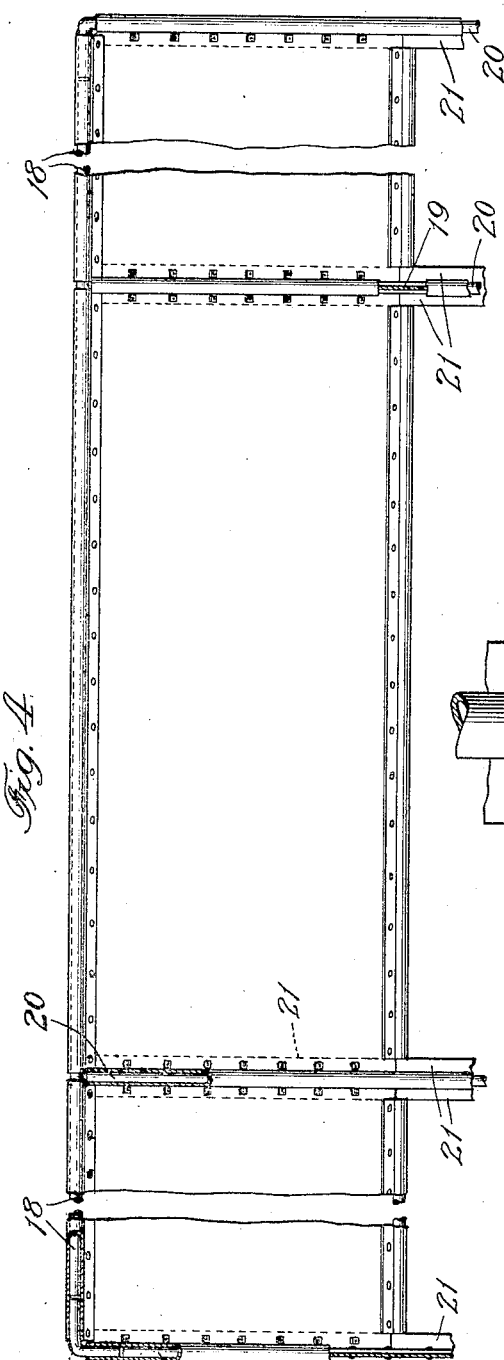
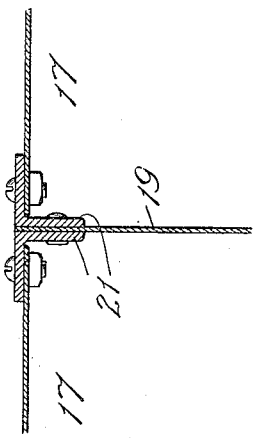
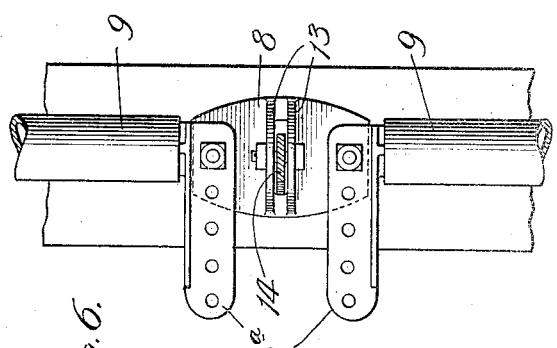
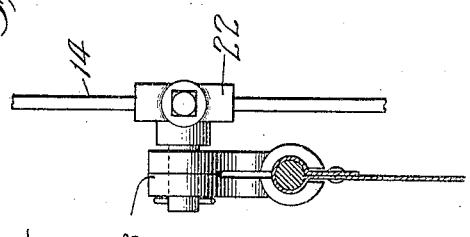
Inventor:
Henry L. Ferris,
By Dyrenforth, Lee, Chritton & Wiles,
Attys.

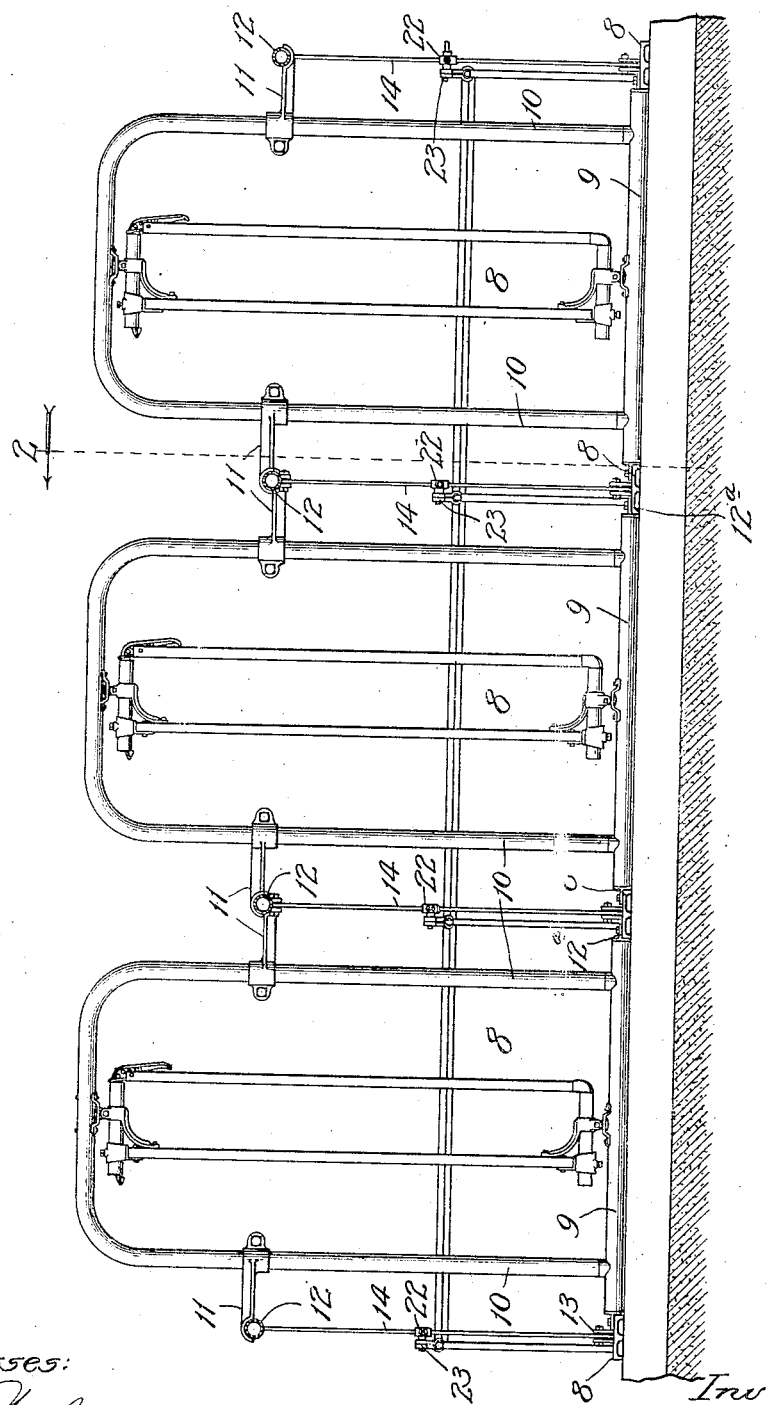

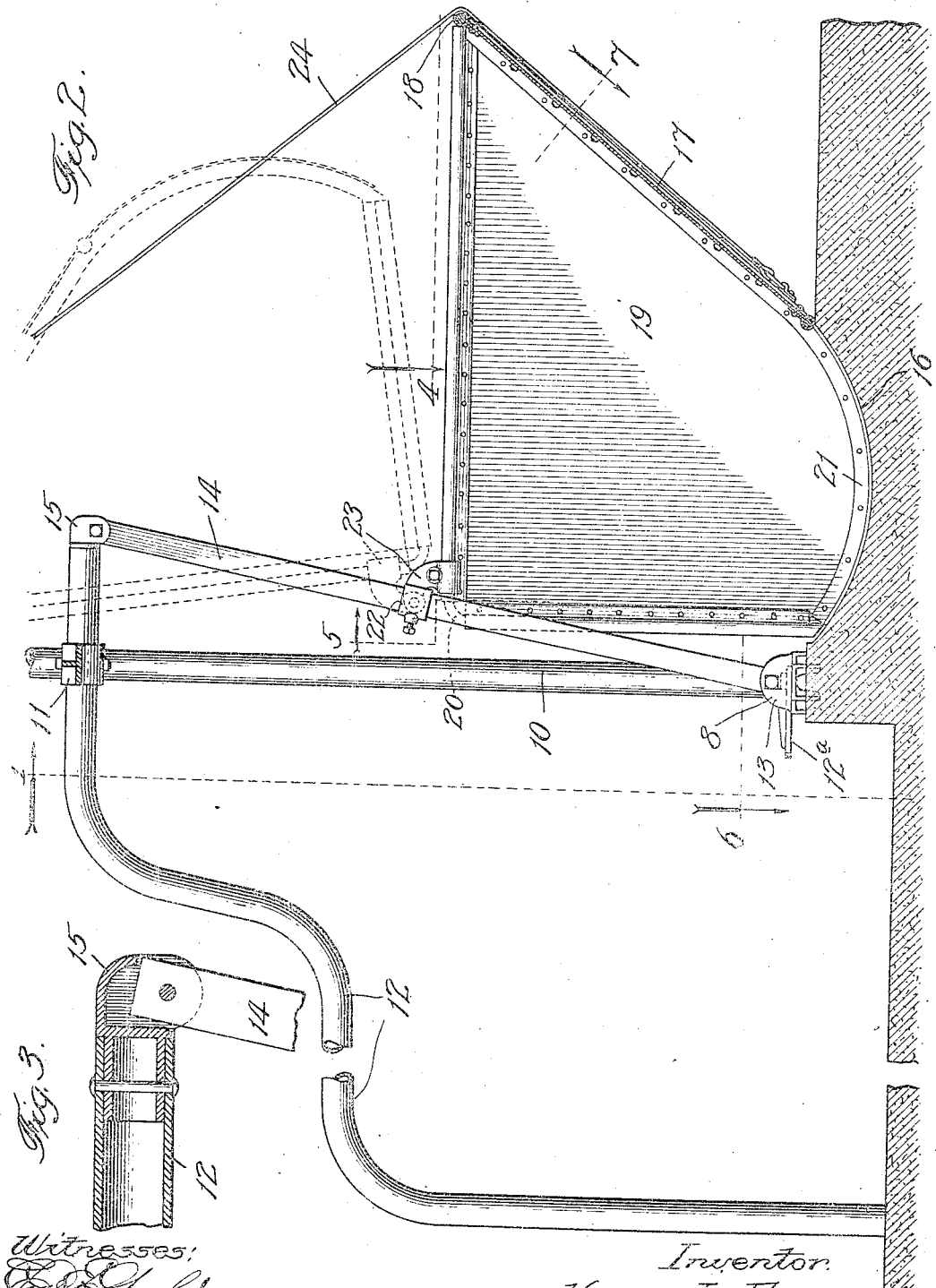

UNITED STATES PATENT OFFICE.

HENRY L. FERRIS, OF HARVARD, ILLINOIS, ASSIGNOR TO HUNT, HELM, FERRIS & COMPANY, OF HARVARD, ILLINOIS, A CORPORATION OF ILLINOIS.

STALL AND MANGER.

1,034,774.  Specification of Letters Patent.  Patented Aug. 6, 1912.

Application filed July 28, 1911. Serial No. 641,103.

*To all whom it may concern:*

Be it known that I, HENRY L. FERRIS, a citizen of the United States, residing at Harvard, in the county of McHenry and State of Illinois, have invented a new and useful Improvement in Stalls and Mangers, of which the following is a specification.

My invention relates to an improved stall and manger which is fully described in the specification and illustrated in the accompanying drawings, in which—

Figure 1 is a longitudinal section on line 1 of Fig. 2; Fig. 2 is an enlarged transverse section on line 2 of Fig. 1; Fig. 3 is a detail sectional view of the front end of a stall-side and the adjacent parts; Fig. 4 is a horizontal section on the line 4 of Fig. 2; Fig. 5 is a section on the broken line 5 of Fig. 2; Fig. 6 is a horizontal section on the line 6 of Fig. 2; and Fig. 7 is a diagonal section on the line 7 of Fig. 2.

Referring to the drawings—8 are supports or feet preferably secured in place in the concrete floor of the barn at intervals corresponding to the width of the respective stalls. Attached to and connecting these supports or feet 8 are cross-bars 9 carrying yoked uprights 10, the cross-bars and yoked uprights forming stanchion-supporting frames of ordinary form. The yoked uprights are adjustably connected by brackets 11 to stall-sides 12. The cross-bars 9 are made adjustable upon the supports or feet 8 by means of perforated fingers 12ª (Fig. 6), any one of the perforations in which may engage the supports or feet for the purpose of making the stanchion-supporting frame adjustable. The supports or feet are provided with upright parallel ears 13 between which is secured the lower end of a manger-supporting bar 14, the upper end of which is secured to a casing 15 riveted in the front end of the corresponding stall-side 12. The brackets 11 are vertically adjustable upon the sides of the stanchion-supporting frame and horizontally adjustable upon the stall-sides, while the connections between the two ends of the manger-supporting bar 14 and the support 8 and casting 15 are preferably pivotal, or at least provided with a reasonable amount of lost motion. As a result of this construction the stall-sides, stanchion-supporting frame and the other parts thus far described can be made of stock sizes and assembled without difficulty. Thus, if the supports or feet 8 are abnormally high or low with reference to the outer or opposite ends of the stall-sides, the variation can be taken up by adjustment of the inner ends of the stall-sides on the stanchion-supporting frames accompanied by a slight swing in the manger-supporting bar 14. In the same way if in erecting the parts and setting them in the concrete the outer ends of the stall-sides and the supports or feet are either unusually far apart or unusually close together, the parts can be adjusted without difficulty.

The floor of the barn is provided with a trough-shaped depression 16 on the opposite side of the stanchion-supporting frame from the stall-sides and this depression forms the bottom of the manger, when said manger is in its normal or lowered position. The manger itself is roughly in the shape of a trough open at the top and bottom, a series of mangers, up to such number as can conveniently be raised and lowered as a single piece, being rigidly fastened together. The mangers are made on the unit system construction, so that any desired number thereof can be assembled in their unified relation without difficulty. To this end each section has a front plate 17 recurved upon itself at its upper edge to receive a longitudinal bar 18. Separating each two mangers in the given series is an end-plate 19, curved at its lower edge to fit the trough 16 in the floor, the cross-plate 19 being recurved at its upper edge to receive a bar 20 which is surrounded also by a corresponding recurved portion along the rear edge of the corresponding cross-plate 19. For the purpose of securing the front plates and cross-plates together in the unit form, each cross-plate is provided along its rear edge, that is, the edge away from the stall, with two angle irons 21 (Fig. 7), to the remaining flanges of which the front plates 17 are secured, while the end cross-plates have only a single angle iron 21, as shown in Fig. 4. The angle-irons are preferably secured to the front plates by bolts, so that the assembling may be done in the processes of erecting.

22 are brackets adjustable up and down on the manger-supporting bars 14. These brackets serve as pivotal supports for manger-clamps 23 which engage the wired upper edges of the cross-plates 19. As a result of this construction, after the stall proper is erected, including the stanchion-supporting frame and after the trough is built in the concrete floor in a fixed position, the brackets 22 may be moved to the proper height and the manger-clamps 23 can be adjusted along the upper edges of the crossplates to bring the mangers into exactly proper relation to their troughs. Each series of mangers is provided with a suitable rope 24, which in accordance with common practice would run over a pulley to a counterweight, and thus each series of mangers could be raised from the position shown in solid to that shown in dotted lines in Fig. 2, for the purpose of laying bare the trough 16 for cleaning. The entire construction is therefore one which can be built of stock parts and in stock sizes, which can be assembled on the premises without difficulty, and which is sufficiently adjustable in all its parts to permit it to accommodate itself without machine operations, such as the drilling of additional holes, to such unavoidable variations in the masonry work as many occur. Furthermore, the construction accommodates itself readily to the unit construction, in that without substantial variation the stalls and mangers can be made with long or short series of any desired or convenient size.

I realize that considerable variation is possible in the details of the present construction without departing from the invention or inventions disclosed, and by having described the same in detail I do not intend to be limited thereto except as pointed out in the following claims, in which it is my intention to claim all the novelty inherent in the device described as broadly as the state of the art will permit.

What I claim as new and desire to secure by Letters Patent is—

1. In combination, a trough in fixed position, an open-bottom manger adapted to engage therewith when lowered, manger-supporting means, and a manger-clamp pivoted on said manger-supporting means and adjustably engaging the manger.

2. In combination, a stationary trough adapted to form a support for the contents of the manger, an open-bottom manger comprising front and cross plates adapted to coöperate with said trough, a manger-clamp adjustable along the upper edge of a cross-plate, and means for pivotally supporting the manger-clamp.

3. In combination, a stationary trough, a manger adapted to coöperate therewith and comprising front and cross plates, the cross plates having beads on their upper edges, manger clamps engaging said beads and means for pivotally supporting the manger-clamps.

4. In combination, stall-sides, the outer ends of which are stationarily fixed in the building, rigidly fixed supports, stanchion-supporting frames secured to the supports, connecting members between the stall-sides and stanchion-supporting frames adjustable on both, a manger-supporting bar carried by the stall-sides and supports, and a manger carried by the manger-supporting bar.

5. In combination, a fixed trough, a manger-supporting bar adjacent thereto, a manger adapted to coöperate with the trough, a bracket adjustable up and down on the manger-supporting bar and a manger-clamp horizontally adjustable on the manger and pivoted to the bracket.

6. In combination, manger supporting means, a swinging manger vertically adjustable thereon, a manger-clamp horizontally adjustable on said manger, and means for pivotally supporting said manger-clamp.

7. In combination, a pivoted manger having cross-plates beaded at their upper edges, manger-clamps adjustably engaging said beads, manger-supporting bars and brackets pivoted to the manger-clamps and adjustable on the manger-supporting bars.

HENRY L. FERRIS.

In presence of—
O. N. SWANGREN,
L. J. ASHBURN.